(12) United States Patent
Zhou et al.

(10) Patent No.: US 10,841,567 B2
(45) Date of Patent: Nov. 17, 2020

(54) VIRTUAL REALITY HELMET AND METHOD FOR USING SAME

(71) Applicant: Qingdao GoerTek Technology Co., Ltd., Qingdao (CN)

(72) Inventors: Ke Zhou, Qingdao (CN); Chao Zhang, Qingdao (CN); Shaoqian Zhang, Qingdao (CN)

(73) Assignee: Qingdao Goertek Technology Co., LTD., Qingdao (CN)

( * ) Notice: Subject to any disclaimer, the term of this patent is extended or adjusted under 35 U.S.C. 154(b) by 0 days.

(21) Appl. No.: 16/081,053

(22) PCT Filed: Dec. 31, 2016

(86) PCT No.: PCT/CN2016/114056
§ 371 (c)(1),
(2) Date: Aug. 30, 2018

(87) PCT Pub. No.: WO2017/202023
PCT Pub. Date: Nov. 30, 2017

(65) Prior Publication Data
US 2019/0075288 A1    Mar. 7, 2019

(30) Foreign Application Priority Data

May 25, 2016    (CN) .......................... 2016 1 0352732

(51) Int. Cl.
*H04N 13/344*    (2018.01)
*H04N 21/422*    (2011.01)
(Continued)

(52) U.S. Cl.
CPC ............. *H04N 13/344* (2018.05); *G06F 3/01* (2013.01); *H04N 13/189* (2018.05);
(Continued)

(58) Field of Classification Search
CPC ......... G06F 3/01; G06F 3/011; H04N 13/189; H04N 13/315; H04N 13/332;
(Continued)

(56) References Cited

U.S. PATENT DOCUMENTS

2009/0265671 A1*   10/2009  Sachs ...................... G06F 3/017
                                                              715/863
2013/0194164 A1    8/2013  Sugden et al.
(Continued)

FOREIGN PATENT DOCUMENTS

CN    203759644 A    8/2014
CN    104618712 A    5/2015
(Continued)

OTHER PUBLICATIONS

Office Action issued in Korean Application No. 2018-7025178 dated Oct. 22, 2019.
(Continued)

*Primary Examiner* — Stacy Khoo
(74) *Attorney, Agent, or Firm* — Fox Rothschild LLP; Carol E. Thorstad-Forsyth

(57) ABSTRACT

The present disclosure discloses a virtual reality (VR) helmet and a method for using same. The virtual reality helmet has two optional playing modes: playing a VR video stored in the storage module, or playing a VR video inputted by the video input device when it is detected that the video input device is connected. Therefore, the VR helmet does not only have the function of inputting a video in a wired way in traditional helmets, but also can play a video which is stored in advance locally, so the user can move around freely without the limitation of the wired input when a local video is played. In a preferred embodiment, the VR helmet, by having a proximity sensor used to monitor the wearing state of the user, enters a standby mode and turns off the display
(Continued)

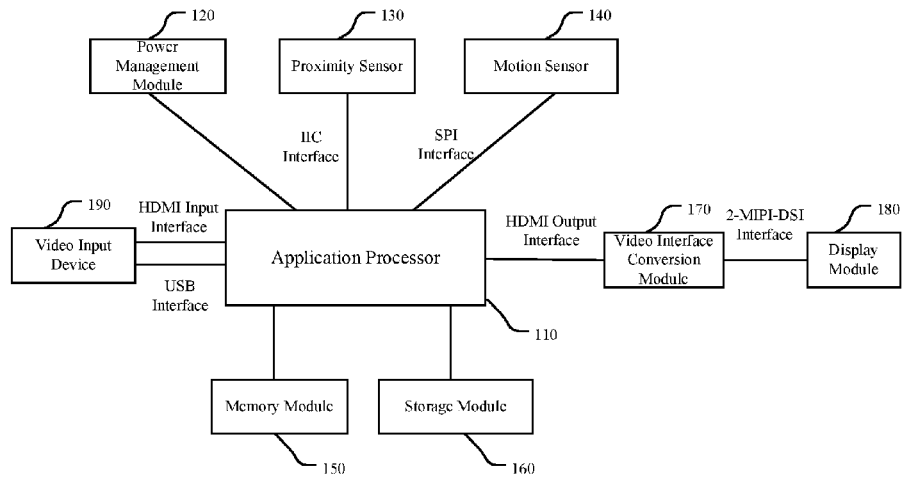

module to reduce the power consumption of the helmet when it is detected that the user takes off the helmet, and exits the low power consumption standby mode and turns on the display module when it is detected that the user is wearing the helmet.

12 Claims, 1 Drawing Sheet

(51) Int. Cl.
    *G06F 3/01*     (2006.01)
    *H04N 21/442*     (2011.01)
    *H04N 13/189*     (2018.01)
    *H04N 13/366*     (2018.01)

(52) U.S. Cl.
    CPC ......... *H04N 13/366* (2018.05); *H04N 21/422* (2013.01); *H04N 21/442* (2013.01)

(58) Field of Classification Search
    CPC .. H04N 13/344; H04N 13/366; H04N 21/422; H04N 21/42201; H04N 21/442; H04N 21/44218
    See application file for complete search history.

(56) References Cited

U.S. PATENT DOCUMENTS

| | | | |
|---|---|---|---|
| 2014/0123015 A1 | 5/2014 | Sako et al. | |
| 2015/0067580 A1 | 3/2015 | Um et al. | |
| 2015/0338653 A1* | 11/2015 | Subramaniam | G02B 27/0172 345/8 |
| 2015/0339861 A1 | 11/2015 | Yun et al. | |
| 2016/0063767 A1 | 3/2016 | Lee et al. | |
| 2017/0244951 A1* | 8/2017 | Ha | G06T 19/006 |

FOREIGN PATENT DOCUMENTS

| | | | | |
|---|---|---|---|---|
| CN | 205051824 U | * | 2/2016 | ........... G06F 1/1632 |
| CN | 105915990 A | | 8/2016 | |
| JP | 2008048234 A | | 2/2008 | |
| JP | 2014532190 A | | 12/2014 | |
| KR | 20150026336 A | | 3/2015 | |
| KR | 20150044488 A | | 4/2015 | |
| WO | 2013024753 A1 | | 2/2013 | |
| WO | 2014197229 A1 | | 12/2014 | |
| WO | 2016013269 A1 | | 1/2018 | |

OTHER PUBLICATIONS

Notice of Reasons for Refusal issued in Japanese Patent Application No. 2018-558725 dated Jan. 28, 2020.

* cited by examiner

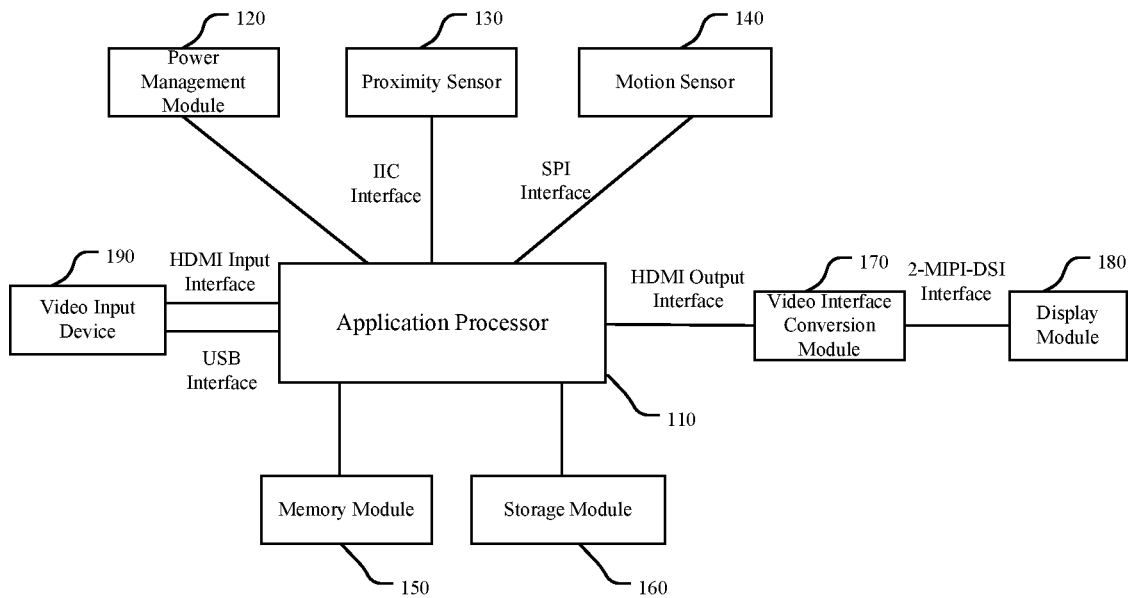

FIG. 1

Storing a VR video in the storage module of the virtual reality helmet, or connecting a video input device through an HDMI input interface and a USB interface disposed on an application processor — 210

Selecting an operation mode of the virtual reality helmet: playing the VR video stored in the storage module, or playing a VR video inputted by the video input device when it is detected that the video input device is connected — 220

FIG. 2

VIRTUAL REALITY HELMET AND METHOD FOR USING SAME

CROSS REFERENCE TO RELATED APPLICATIONS

This application is a U.S. National Stage entry under 35 U.S.C. § 371 based on International Application No. PCT/CN2016/114056, filed on Dec. 31, 2016, which was published under PCT Article 21(2) and which claims priority to Chinese Patent Application No. 201610352732.6, filed on May 25, 2016. The disclosure of the priority applications are hereby incorporated herein in their entirety by reference.

TECHNICAL FIELD

The present disclosure relates to the field of virtual reality, and more specifically to a virtual reality helmet and a method for using the same.

BACKGROUND

As a recently emerging high technology, virtual reality (VR) creates a three-dimensional virtual world using computer simulation, and simulates the user's vision, hearing, touch, etc., to provide the user an immersive feeling. In a typical virtual reality application scenario, the user wears a virtual reality helmet and tracks various motions of the head by using various sensors, and behavior data are generated by a behavior interpreter and then inputted into a virtual environment to interact with the user.

At present, most virtual reality helmets require external video input devices, and most connection methods are wired. However, wired connection has a shortcoming that the user cannot move around freely, which greatly reduces the comfort and the real experience required by virtual reality. However, wireless video transmission solutions are expensive and not yet mature.

SUMMARY

In view of the above problems, the present disclosure provides a virtual reality helmet and a method for using the same to solve the problems of the prior art that external video input devices are indispensable to play, playing modes are few in number, and the user cannot move around freely in many cases due to the limitation of wired connection.

To achieve the above object, the technical solutions of the present disclosure are as follows.

According to the first aspect of the present disclosure, a virtual reality helmet is provided. The virtual reality helmet comprises an application processor, a display module, and a power management module, a memory module, a video interface conversion module and a motion sensor which are connected with the application processor, the display module being connected to the application processor through the video interface conversion module, wherein the virtual reality helmet further comprises a storage module storing a virtual reality video;

an interface for connecting a video input device to access is provided on the application processor; and the virtual reality helmet has two playing modes: playing the VR video stored in the storage module, or playing a VR video inputted by the video input device when it is detected that the video input device is connected.

In some embodiments, the application processor is connected to the video input device through an HDMI input interface and a USB interface;

in the VR video playing process, the motion sensor detects a motion of a head of the user, and transmits the detected motion data to a CPU chip of the application processor;

in the playing the VR video stored in the storage module, the CPU chip parses the motion data, acquires interaction information, and transmits corresponding video information to the display module through the video interface conversion module; and in the playing a VR video inputted by the video input device, the CPU chip does not parse the motion data but passes the motion data to the video input device through the USB interface, and the video input device parses the motion data, acquires interaction information, forwards corresponding video information to the video interface conversion module through the CPU chip, and then transmits the corresponding video information to the display module through the video interface conversion module.

In some embodiments, the display module comprises a left-eye display and a right-eye display which are symmetrical;

the video interface conversion module comprises two channels of MIPI-DSI interfaces, and connects to the left-eye display and the right-eye display of the display module through the channels of MIPI-DSI interfaces; and the application processor further comprises a GPU chip, and after being image deformation processed by the GPU chip of the application processor, the VR video stored in the storage module or the VR video inputted by the video input device is through the video interface conversion module transmitted to the left-eye display and the right-eye display and displayed.

In some embodiments, the motion sensor is a nine-axis sensor comprising: a gyro sensor, a geomagnetic sensor, and an acceleration sensor; and the application processor is connected to the motion sensor through an SPI interface and is connected to the video interface conversion module through an HDMI output interface.

In some embodiments, the virtual reality helmet further comprises a proximity sensor connected to the application processor through an IIC interface;

when the user is wearing the virtual reality helmet, a detection numerical value of the proximity sensor becomes greater, and the application processor exits a low power consumption standby mode and turns on the display module; and when the user takes off the virtual reality helmet, the detection numerical value of the proximity sensor becomes less, and the application processor turns off the display module and enters the low power consumption standby mode.

According to the second aspect of the present disclosure, a method for using the virtual reality helmet as sated above is provided. The method comprises:

storing a VR video in the storage module of the virtual reality helmet, or connecting a video input device through an interface disposed on the application processor; and selecting an playing mode of the virtual reality helmet: playing the VR video stored in the storage module, or playing a VR video inputted by the video input device when it is detected that the video input device is connected.

In some embodiments, the application processor is connected to the video input device through an HDMI input interface and a USB interface;

in the VR video playing process, the motion sensor of the virtual reality helmet detects a motion of a head of the user, and transmits the detected motion data to a CPU chip of the application processor;

in the playing the VR video stored in the storage module, the CPU chip parses the motion data, acquires interaction information, and transmits corresponding video information to the display module through the video interface conversion module; and in the playing a VR video inputted by the video input device, the CPU chip does not parse the motion data but passes the motion data to the video input device through the USB interface, and the video input device parses the motion data, acquires interaction information, forwards corresponding video information to the video interface conversion module through the CPU chip, and then transmits the corresponding video information to the display module through the video interface conversion module.

In some embodiments, the display module is set as a left-eye display and a right-eye display which are symmetrical;

the video interface conversion module is connected to the left-eye display and the right-eye display of the display module through two channels of MIPI-DSI interfaces; and a GPU chip is provided in the application processor to perform image deformation processing on the VR video stored in the storage module or the VR video inputted by the video input device, and the VR video after being image deformation processed is through the video interface conversion module transmitted to the left-eye display and the right-eye display and displayed.

In some embodiments, a proximity sensor is provided on the virtual reality helmet and connected to the application processor through an IIC interface, and a detection numerical value of the proximity sensor becomes greater when the user is wearing the virtual reality helmet and becomes less when the user takes off the virtual reality helmet;

when a detection numerical value of the proximity sensor becomes greater, the application processor exits a low power consumption standby mode and turns on the display module; and when the detection numerical value of the proximity sensor becomes less, the application processor turns off the display module and enters the low power consumption standby mode.

The advantageous effects of the present disclosure are as follows. According to the virtual reality helmet and the method for using the same of the present disclosure, the virtual reality helmet has two optional playing modes: playing the VR video stored in the storage module, or playing a VR video inputted by the video input device when it is detected that the video input device is connected. Therefore, the virtual reality helmet of the present disclosure does not only have the function of inputting a video in a wired way in traditional helmets, but also can play a video which is stored in advance locally, so the user can move around freely without the limitation of the wired input when a local video is played, which greatly improves the comfort of the helmet and the user experience.

In one or more embodiments, the virtual reality helmet, by having a proximity sensor used to monitor the wearing state of the user, enters a standby mode and turns off the display module to reduce the power consumption of the helmet when it is detected that the user takes off the helmet, and exits the low power consumption standby mode and turns on the display module when it is detected that the user is wearing the helmet, thereby enhancing the user experience.

BRIEF DESCRIPTION OF DRAWINGS

FIG. 1 is a schematic diagram of a virtual reality helmet according to an embodiment of the present disclosure; and FIG. 2 is a flowchart of a method for using a virtual reality helmet according to an embodiment of the present disclosure.

DETAILED DESCRIPTION

In order to make the objectives, technical solutions and advantages of the present disclosure clearer, the present disclosure is further described in detail with reference to the accompanying drawings.

As shown in FIG. 1, the embodiment of the present disclosure provides a virtual reality helmet comprising: an application processor 110, a power management module 120, a storage module 160, a memory module 150, a video interface conversion module 170, a motion sensor 140, and a display module 180. The power management module 120, the storage module 160, the memory module 150, the video interface conversion module 170, and the motion sensor 140 are individually connected with the application processor 110. The display module 180 is connected with the video interface conversion module 170. The memory module 150 may be, for example, DDR (Double Data Rate). The storage module 160 may be, for example, an SD card or an eMMC (Embedded Multi Media Card).

In some embodiment of the present disclosure, the application processor 110 comprises a CPU chip, a GPU chip, and several peripheral interfaces. The GPU (Graphics Processing Unit) is a microprocessor that performs image operations on computers, workstations, game machines, and some mobile devices such as tablets, smart phones, etc. The power management module 120, the storage module 160, the memory module 150, the video interface conversion module 170, and the motion sensor are individually connected to the application processor 110 through corresponding peripheral interfaces. The display module 180 uses convex lenses, and comprises a left-eye display and a right-eye display which are symmetrical. The video interface conversion module 170 is connected to the left-eye display and the right-eye display. The application processor 110 conducts image deformation processing to the VR video to be played by using the GPU chip, and then transmits it by using the video interface conversion module 170 to the left-eye display and the right-eye display to play, to enable the user to see a 3D stereoscopic video.

In some embodiment of the present disclosure, the peripheral interfaces in the application processor 110 comprise an HDMI input interface, an HDMI output interface, a USB interface, and an SPI interface. The application processor 110 is connected to the motion sensor through the SPI interface, is connected to the video interface conversion module 170 through the HDMI output interface, and is connected to the video input device 190 through the HDMI input interface and the USB interface. The video signal of the video input device 190 is transmitted through the HDMI interface. The video interface conversion module 170 converts the HDMI interface into a MIPI-DSI interface. The video interface conversion module 170 comprises two channels of MIPI-DSI interfaces (Display Serial Interface) which are individually connected to the left-eye display and right-eye display of the display module 180.

In some embodiment of the present disclosure, the virtual reality helmet operates in two modes. One is that when the helmet detects that the video input device 190 is connected, the VR video inputted by the video input device 190 is played. The other mode is to play a VR video stored in advance in the storage module 160. Therefore, the helmet of the present disclosure does not only have the function of inputting a video in a wired way in traditional helmets, but also can play a video which is stored in advance locally, so the user can move around freely wearing the virtual reality helmet without the limitation of the wired input, which greatly improves the comfort of the helmet and the user experience.

In the VR video playing process of the virtual reality helmet, the motion sensor detects a motion of a head of the user and transmits the detected motion data to the application processor 110. When the VR video stored in the storage module 160 is played, the CPU chip parses the motion data, acquires interaction information, and transmits corresponding video information to the display module 180 through the video interface conversion module 170. When the VR video inputted by the video input device 190 is played, the CPU chip does not parse the motion data but passes them to the video input device 190 through the USB interface, and the video input device 190 parses the motion data, acquires interaction information, forwards corresponding video information to the video interface conversion module 170 through the CPU chip, and then transmits it to the display module 180 through the video interface conversion module 170, thereby greatly satisfying the user's requirement of virtual reality experience.

In a preferred embodiment of the present disclosure, the motion sensor is a nine-axis sensor 140 comprising a gyro sensor, a geomagnetic sensor, and an acceleration sensor. The gyro sensor is used to detect changes in the rotational angular velocity during deflection and tilt. The acceleration sensor is used to detect linear movements in the axial direction. The geomagnetic sensor is used to detect the change in the magnetic field due to the motion of the user, so that the acceleration sensor or the angular velocity sensor is offset-corrected to make the detection result more accurate. The motion sensor transmits the detected motion data to the CPU chip of the application processor 110 through the SPI interface. The application processor 110 parses the motion data and transmits them to the video input device 190 through the USB interface, and the video input device 190 parses, acquires the interaction information and outputs a corresponding video signal, so that the displayed video can change along with a motion of a head of the user.

In a preferred embodiment of the present disclosure, the virtual reality helmet further comprises a proximity sensor 130. The proximity sensor 130 is connected to the application processor 110 through an ITC interface. When the user is wearing the virtual reality helmet, the detection numerical value of the proximity sensor 130 becomes greater, and the application processor 110 exits a low power consumption standby mode and turns on the display module 180. When the user takes off the virtual reality helmet, the detection numerical value of the proximity sensor 130 becomes less, and the application processor 110 turns off the display module 180 and enters the low power consumption standby mode to reduce the power consumption of the helmet.

The present disclosure further provides a method for using the virtual reality helmet as described above. As shown in FIG. 2, the method comprises:

Step S210: storing a VR video in the storage module of the virtual reality helmet, or connecting a video input device through an HDMI input interface and a USB interface disposed on an application processor; and Step S220: selecting an operation mode of the virtual reality helmet: playing the VR video stored in the storage module, or playing a VR video inputted by the video input device when it is detected that the video input device is connected.

In some embodiment of the present disclosure, the method shown in FIG. 2 further comprises: in the VR video playing process, the motion sensor of the virtual reality helmet detects a motion of a head of the user, and transmits the detected motion data to a CPU chip of the application processor. In the playing the virtual reality video stored in the storage module, the CPU chip parses the motion data, acquires interaction information, and transmits corresponding video information to the display module through the video interface conversion module. In the playing a VR video inputted by the video input device, the CPU chip does not parse the motion data but passes the motion data to the video input device through the USB interface, and the video input device parses the motion data, acquires interaction information, forwards corresponding video information to the video interface conversion module through the CPU chip, and then transmits the corresponding video information to the display module through the video interface conversion module.

In some embodiment of the present disclosure, the method shown in FIG. 2 further comprises: the display module is set as a left-eye display and a right-eye display which are symmetrical; and the video interface conversion module is connected to the left-eye display and the right-eye display of the display module through two channels of MIPI-DSI interfaces.

A GPU chip is provided in the application processor to perform image deformation processing on the VR video stored in the storage module or the VR video inputted by the video input device, and the VR video after being image deformation processed is through the video interface conversion module transmitted to the left-eye display and the right-eye display and displayed.

In some embodiment of the present disclosure, the method shown in FIG. 2 further comprises: a proximity sensor is provided on the virtual reality helmet, and connected to the application processor through an IIC interface, wherein a detection numerical value of the proximity sensor becomes greater when the user is wearing the virtual reality helmet, and becomes less when the user takes off the virtual reality helmet. When a detection numerical value of the proximity sensor becomes greater, the application processor exits a low power consumption standby mode and turns on the display module; and when the detection numerical value of the proximity sensor becomes less, the application processor turns off the display module and enters the low power consumption standby mode.

In summary, the advantageous effects of the embodiments of the present disclosure are as follows. According to the virtual reality helmet and the method for using the same of the present disclosure, the virtual reality helmet has two optional playing modes: playing the VR video stored in the storage module, or playing a VR video inputted by the video input device when it is detected that the video input device is connected. Therefore, the virtual reality helmet of the present disclosure does not only have the function of inputting a video in a wired way in traditional helmets, but also can play a video which is stored in advance locally, so the user can move around freely without the limitation of the wired input when a local video is played, which greatly improves the comfort of the helmet and the user experience.

In a preferred embodiment, the virtual reality helmet, by having a proximity sensor used to monitor the wearing state of the user, enters a standby mode and turns off the display module to reduce the power consumption of the helmet when it is detected that the user takes off the helmet, and exits the low power consumption standby mode and turns on the display module when it is detected that the user is wearing the helmet, thereby enhancing the user experience.

The above description is only the preferred embodiments of the present disclosure and is not intended to limit the protection scope of the present disclosure. Any modification, equivalent replacement, and improvement made within the spirit and principle of the present disclosure shall all be included in the protection scope of the present disclosure.

What is claimed is:

1. A virtual reality helmet comprising an application processor, a display module, a power management module, a memory module, a storage module, a video interface conversion module and a motion sensor, wherein the power management module, the memory module, the storage module, the video interface conversion module and the motion sensor are respectively connected to the application processor, and the display module is connected to the application processor through the video interface conversion module, wherein
   the storage module is for storing a virtual reality video;
   an interface for connecting a video input device to access is provided on the application processor; and
   the virtual reality helmet has two playing modes: one is playing the virtual reality video stored in the storage module when it is detected that the video input device is not connected, the other is playing a virtual reality video inputted by the video input device when it is detected that the video input device is connected;
   wherein:
      the application processor is connected to the video input device through a High Definition Multimedia Interface (HDMI) input interface and a Universal Serial Bus (USB) interface;
      in the virtual reality video playing process, the motion sensor detects a motion of a head of a user, and transmits the detected motion data to a Central Processing Unit (CPU) chip of the application processor;
      in the playing mode of playing the virtual reality video stored in the storage module when it is detected that the video input device is not connected, the CPU chip parses the motion data, acquires interaction information, and transmits corresponding video information to the display module through the video interface conversion module; and
      in the playing mode of playing a virtual reality video inputted by the video input device when it is detected that the video input device is connected, the CPU chip does not parse the motion data but passes the motion data to the video input device through the USB interface, and the video input device parses the motion data, acquires interaction information, forwards corresponding video information to the video interface conversion module through the CPU chip, and then transmits the corresponding video information to the display module through the video interface conversion module.

2. The virtual reality helmet according to claim 1, wherein
   the display module comprises a left-eye display and a right-eye display which are symmetrical;
   the video interface conversion module comprises two channels of Mobile Industry Processor Interface-Display Serial Interface (MIPI-DSI) interfaces, and connects to the left-eye display and the right-eye display of the display module through the channels of MIPI-DSI interfaces; and
   the application processor further comprises a Graphics Processing Unit (GPU) chip, and after being image deformation processed by the GPU chip of the application processor, the virtual reality video stored in the storage module or the virtual reality video inputted by the video input device is through the video interface conversion module transmitted to the left-eye display and the right-eye display and displayed.

3. The virtual reality helmet according to claim 2, wherein
   the virtual reality helmet further comprises a proximity sensor connected to the application processor through an Inter-Integrated Circuit (IIC) interface;
   when the user is wearing the virtual reality helmet, a detection numerical value of the proximity sensor becomes greater, and the application processor exits a low power consumption standby mode and turns on the display module; and
   when the user takes off the virtual reality helmet, the detection numerical value of the proximity sensor becomes less, and the application processor turns off the display module and enters the low power consumption standby mode.

4. The virtual reality helmet according to claim 1, wherein
   the motion sensor is a nine-axis sensor comprising: a gyro sensor, a geomagnetic sensor, and an acceleration sensor; and
   the application processor is connected to the motion sensor through a Serial Peripheral Interface (SPI) interface and is connected to the video interface conversion module through a High Definition Multimedia Interface (HDMI) output interface.

5. The virtual reality helmet according to claim 4, wherein
   the virtual reality helmet further comprises a proximity sensor connected to the application processor through an Inter-Integrated Circuit (IIC) interface;
   when the user is wearing the virtual reality helmet, a detection numerical value of the proximity sensor becomes greater, and the application processor exits a low power consumption standby mode and turns on the display module; and
   when the user takes off the virtual reality helmet, the detection numerical value of the proximity sensor becomes less, and the application processor turns off the display module and enters the low power consumption standby mode.

6. The virtual reality helmet according to claim 1, wherein
   the virtual reality helmet further comprises a proximity sensor connected to the application processor through an Inter-Integrated Circuit (IIC) interface;
   when the user is wearing the virtual reality helmet, a detection numerical value of the proximity sensor becomes greater, and the application processor exits a low power consumption standby mode and turns on the display module; and
   when the user takes off the virtual reality helmet, the detection numerical value of the proximity sensor becomes less, and the application processor turns off the display module and enters the low power consumption standby mode.

7. The virtual reality helmet according to claim 1, wherein the virtual reality helmet further comprises a proximity sensor connected to the application processor through an Inter-Integrated Circuit (IIC) interface;
when the user is wearing the virtual reality helmet, a detection numerical value of the proximity sensor becomes greater, and the application processor exits a low power consumption standby mode and turns on the display module; and
when the user takes off the virtual reality helmet, the detection numerical value of the proximity sensor becomes less, and the application processor turns off the display module and enters the low power consumption standby mode.

8. A method for using a virtual reality helmet, comprising:
storing a virtual reality video in a storage module of the virtual reality helmet, or connecting a video input device through an interface disposed on an application processor; and
selecting a playing mode of the virtual reality helmet from two playing modes: one is playing the virtual reality video stored in the storage module when it is detected that the video input device is not connected, the other is playing a virtual reality video inputted by the video input device when it is detected that the video input device is connected;
wherein:
the application processor is connected to the video input device through an HDMI (High Definition Multimedia Interface) input interface and a USB (Universal Serial Bus) interface;
in the virtual reality video playing process, a motion sensor detects a motion of a head of a user, and transmits the detected motion data to a CPU (Central Processing Unit) chip of the application processor;
in the playing mode of playing the virtual reality video stored in the storage module when it is detected that the video input device is not connected, the CPU chip parses the motion data, acquires interaction information, and transmits corresponding video information to a display module through a video interface conversion module; and
in the playing mode of playing a virtual reality video inputted by the video input device when it is detected that the video input device is connected, the CPU chip does not parse the motion data but passes the motion data to the video input device through the USB interface, and the video input device parses the motion data, acquires interaction information, forwards corresponding video information to the video interface conversion module through the CPU chip, and then transmits the corresponding video information to the display module through the video interface conversion module.

9. The method according to claim 8, wherein
the display module is set as a left-eye display and a right-eye display which are symmetrical;
the video interface conversion module is connected to the left-eye display and the right-eye display of the display module through two channels of Mobile Industry Processor Interface-Display Serial Interface (MIPI-DSI) interfaces; and
a Graphics Processing Unit (GPU) chip is provided in the application processor to perform image deformation processing on the virtual reality video stored in the storage module or the virtual reality video inputted by the video input device, and the virtual reality video after being image deformation processed is through the video interface conversion module transmitted to the left-eye display and the right-eye display and displayed.

10. The method according to claim 9, wherein
a proximity sensor is provided on the virtual reality helmet and connected to the application processor through an Inter-Integrated Circuit (IIC) interface, and a detection numerical value of the proximity sensor becomes greater when the user is wearing the virtual reality helmet and becomes less when the user takes off the virtual reality helmet;
when a detection numerical value of the proximity sensor becomes greater, the application processor exits a low power consumption standby mode and turns on the display module; and
when the detection numerical value of the proximity sensor becomes less, the application processor turns off the display module and enters the low power consumption standby mode.

11. The method according to claim 8, wherein
a proximity sensor is provided on the virtual reality helmet and connected to the application processor through an Inter-Integrated Circuit (IIC) interface, and a detection numerical value of the proximity sensor becomes greater when the user is wearing the virtual reality helmet and becomes less when the user takes off the virtual reality helmet;
when a detection numerical value of the proximity sensor becomes greater, the application processor exits a low power consumption standby mode and turns on the display module; and
when the detection numerical value of the proximity sensor becomes less, the application processor turns off the display module and enters the low power consumption standby mode.

12. The method according to claim 8, wherein
a proximity sensor is provided on the virtual reality helmet and connected to the application processor through an Inter-Integrated Circuit (IIC) interface, and a detection numerical value of the proximity sensor becomes greater when the user is wearing the virtual reality helmet and becomes less when the user takes off the virtual reality helmet;
when a detection numerical value of the proximity sensor becomes greater, the application processor exits a low power consumption standby mode and turns on the display module; and
when the detection numerical value of the proximity sensor becomes less, the application processor turns off the display module and enters the low power consumption standby mode.

* * * * *